United States Patent
Hasific

(10) Patent No.: US 10,427,355 B2
(45) Date of Patent: Oct. 1, 2019

(54) TUBE END DETECTION

(71) Applicant: Georg Fischer Rohrleitungssysteme AG, Schaffhausen (CH)

(72) Inventor: Edin Hasific, Schaffhausen (CH)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 218 days.

(21) Appl. No.: 15/598,895

(22) Filed: May 18, 2017

(65) Prior Publication Data

US 2017/0361538 A1 Dec. 21, 2017

(30) Foreign Application Priority Data

Jun. 16, 2016 (EP) .................................. 16174724

(51) Int. Cl.
*B29C 65/20* (2006.01)
*B29D 23/00* (2006.01)
(Continued)

(52) U.S. Cl.
CPC .......... *B29C 65/20* (2013.01); *B29C 65/2084* (2013.01); *B29C 65/2092* (2013.01);
(Continued)

(58) Field of Classification Search
CPC ..... B29C 65/18; B29C 65/20; B29C 65/2076; B29C 65/2084; B29C 65/2092;
(Continued)

(56) References Cited

U.S. PATENT DOCUMENTS 5,013,376 A * 5/1991 McElroy, II ........ B29C 65/7802
156/358
5,620,625 A * 4/1997 Sauron ................ B29C 66/1142
156/304.2
(Continued)

FOREIGN PATENT DOCUMENTS

EP 0402910 A2 12/1990
EP 0535454 A2 4/1993
(Continued)

OTHER PUBLICATIONS

Extended European Search Report (in German) issued by the European Patent Office (EPO) regarding EP Application No. 16 174 724.1 dated Jan. 2, 2017 (8 pages).

*Primary Examiner* — Michael A Tolin
(74) *Attorney, Agent, or Firm* — Harness, Dickey & Pierce, P.L.C.

(57) ABSTRACT

A method, and an apparatus associated therewith, for detecting plastic tube ends clamped in a butt welding machine, the plastic tube ends being planed by means of a plane, which can be introduced between the plastic tube ends, and subsequently being heated by means of a heating mirror, which can be introduced between the plastic tube ends, and the plastic tube ends are welded together after removal of the heating mirror, the plane and/or the heating mirror being tilted in between the plastic tube ends by means of a controlled movement, wherein detection or sensing of the plastic tube ends during the controlled movement of tilting in the plane and/or the heating mirror is carried out by means of at least one sensor arranged on the plane and/or on the heating mirror.

12 Claims, 5 Drawing Sheets

(51) Int. Cl.
 *B29C 65/78* (2006.01)
 *B29C 65/00* (2006.01)
(52) U.S. Cl.
 CPC ...... *B29C 65/7802* (2013.01); *B29C 65/7841* (2013.01); *B29C 66/02* (2013.01); *B29C 66/02241* (2013.01); *B29C 66/1142* (2013.01); *B29C 66/32* (2013.01); *B29C 66/522* (2013.01); *B29C 66/5221* (2013.01); *B29C 66/80* (2013.01); *B29C 66/8414* (2013.01); *B29C 66/95* (2013.01); *B29C 66/954* (2013.01); *B29C 66/9672* (2013.01); *B29D 23/003* (2013.01)
(58) Field of Classification Search
 CPC . B29C 65/7802; B29C 65/7841; B29C 66/02; B29C 66/0224; B29C 66/02241; B29C 66/02245; B29C 66/1142; B29C 66/5221; B29C 66/73921; B29C 66/8414; B29C 66/95; B29C 66/954; B29C 66/959; B29C 66/9592; B29C 66/9672; B29D 23/003; B29L 2031/24

See application file for complete search history.

(56) References Cited

U.S. PATENT DOCUMENTS

| | | | | |
|---|---|---|---|---|
| 5,632,845 | A | * | 5/1997 | Stehle ................. B29C 65/1412 156/158 |
| 2016/0003751 | A1 | * | 1/2016 | Reiz ..................... G01N 21/952 356/237.2 |

FOREIGN PATENT DOCUMENTS

| | | |
|---|---|---|
| EP | 2360009 A2 | 8/2011 |
| EP | 2963380 A1 | 1/2016 |

\* cited by examiner

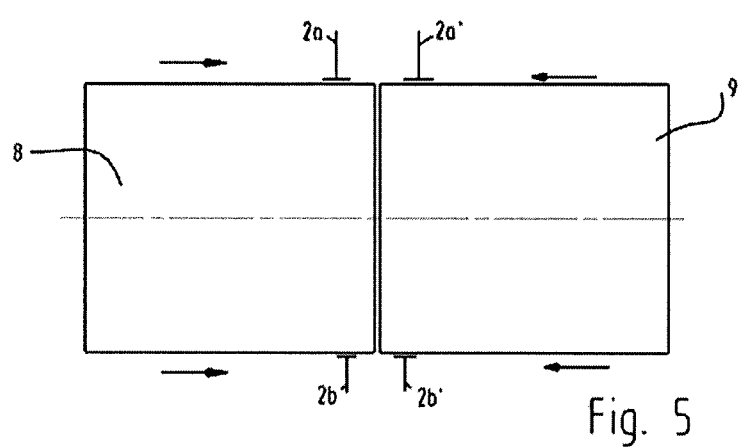

TUBE END DETECTION

CROSS-REFERENCE TO RELATED APPLICATIONS

This application claims the benefit and priority of EP 16 174 724.1, filed Jun. 16, 2016. The entire disclosure of the above application is incorporated herein by reference.

BACKGROUND OF THE INVENTION

Technical Field

The invention relates to a method, and an apparatus associated therewith, for detecting plastic tube ends clamped in a butt welding machine, the plastic tube ends being planed by means of a plane, which can be introduced between the plastic tube ends, and subsequently being heated by means of a heating mirror, which can be introduced between the plastic tube ends, and the plastic tube ends are welded together after removal of the heating mirror, the plane and/or the heating mirror being tilted in between the plastic tube ends by means of a controlled movement.

Discussion

Butt welding machines are used to connect two plastic pipeline ends, the butt welding machines known from the prior art usually being manually actuable, in particular the process of planing and heating the tube ends.

Previously, it has been possible for the tube parameters entered by the butt welding machine operator, which have to be input manually into the machine for the welding, not to coincide with the tube ends clamped in the butt welding machine. For example, it has been possible for incorrect tube dimensions to be entered into the controller, which have then not led to the required welding parameters such as time, temperature, pressure, etc., which correspond to the pipelines. It was therefore possible to carry out the welding with incorrect parameters, which then led to unusable welding.

EP 0 535 454 A2 discloses a device for welding plastic parts, the processing tool and also the heating apparatus being tilted by hand between the tube ends. In order to carry out the corresponding welding procedure, the plastic raw data, for example dimension, material, etc., are entered manually into the device by the operator, the stored welding parameters being selected by the system on the basis of said data, and the device correspondingly applies them, for example preheating the heating apparatus to the corresponding temperature, etc.

As already mentioned, the disadvantage arises in this case that incorrect values, which do not correspond to the clamped tube ends, may be entered by the operator, and the device nevertheless carries out welding on the basis of incorrect values, which generally makes the welding unusable.

SUMMARY OF THE INVENTION

It is an aspect of the invention to propose a method, and an apparatus associated therewith, which ensures that the welding of the plastic tube ends is carried out correctly, i.e. with the welding parameters corresponding to the clamped plastic tube ends, and welding cannot be carried out with incorrect values.

This is achieved according to the invention in that detection or sensing of the plastic tube ends during the controlled movement of tilting in the plane and/or the heating mirror is carried out by means of at least one sensor arranged on the plane and/or on the heating mirror. The plane and/or the heating mirror is tilted between the plastic tube ends, the tilting process being carried out while being controlled. This means that the plane and/or the heating mirror is tilted in automatically in order to obtain a defined movement process of the plane and/or the heating mirror. The speed with which the plane and/or the heating mirror is tilted in is preferably constant. The sensor arranged on the plane and/or the heating mirror is therefore tilted along a predetermined curve, or radius past the tube ends and therefore senses the tube ends for a particular period of time during the tilting process, which makes it possible to determine the tube dimension with the aid of the controller.

The plane and/or the heating mirror is tilted at a defined speed in or between the tube ends, which allows the sensor or the controller to determine the dimension of the tube ends on the basis of the period of time during which the sensor senses the tube end.

As an alternative, the plane and/or the heating mirror may also be tilted with a variable tilting speed in between the clamping points, or the clamped tube ends, the variable tilting speed being regulated with the aid of the controller, it therefore also being possible to determine the dimension of the clamped tube ends.

Firstly, the tube dimension value determined is intended to be used as a check, that is to say the operator still enters the values of the tube manually but the controller compares these values with the values determined by the sensor. In the absence of a match, the controller requires the operator to verify the values in order to avoid incorrect welding.

Of course, it is also possible to configure the apparatus, or the method, with the aid of the controller in such a way that the entire procedure is carried out automatically, and the data determined by the sensor are used not only as a check but as definitive values on the basis of which the welding is to be carried out. The operator would then no longer need to enter any values, and instead the process would take place fully automatically.

It has been found to be advantageous for the two opposing plastic tube ends respectively to be detected or sensed by means of a separate sensor. This requires that the sensors be arranged on both sides of the plane and/or the heating mirror. In this way, it is also possible to determine whether two different plastic tubes have been clamped incorrectly in the welding apparatus.

An optical sensor is used as a preferred sensor for the detection of the tube ends. This has the advantage that it does not have to be tilted past particularly close to the plastic tube end in order to determine the values.

As another preferred embodiment, a laser is used as the sensor; this also allows uncomplicated sensing of the tube ends.

As another configuration of the present invention, a capacitive sensor may also be used in order to sense the tube ends. The choice of the sensor to be used is to be made according to the field of use, or according to the ambient conditions.

In order to allow an automatic process which is suitable for different tube dimensions, it is advantageous for the detection or sensing of the plastic tube ends to be carried out contactlessly. The sensor used is preferably used to detect or sense the tube dimension.

It has been found to be a preferred embodiment that the sensor is also used for the tube material detection.

Detecting the material of the tubes is made possible by the sensed tube dimensions, that is to say the inner and outer diameters, being specially assigned correspondingly to each material. The standard values of the tube dimensions, with the materials associated therewith, are therefore stored in the controller so that the controller can determine the material from which the tube ends are produced on the basis of the tube dimension values sensed by the sensor.

Another configuration of the invention consists in using a color sensor, by means of which the material is detected. The detection of the material, or of the plastic, is not carried out purely by means of the color sensor, but may also, as already mentioned above, be determined by means of the detection of the tube dimensions, or the inner and outer diameters, which have their own corresponding allocation for each material, in which case the color sensor may also be used as an aid to ensure the correct material allocation.

As an alternative, a hardness test may be carried out in a similar way to the Brinell or Rockwell hardness test, in order to determine the material and to generate the required welding parameters.

One embodiment which may be envisioned for carrying out this test consists, for example, in providing a test mandrel below the plastic tube, which makes it possible to determine the material with the aid of the penetration depth, which has been determined, into the tube end or by measuring the length change of the test mandrel.

The butt welding apparatus according to the invention for carrying out the method according to the invention of plastic tube ends contains two clamping points arranged in a coaxial position, the clamping points holding or fixing the plastic tube ends, a plane, the plane being capable of being introduced between the plastic tube ends in order to plane the plastic tube ends, and a heating mirror for subsequent heating of the plastic tube ends, the heating mirror being capable of being introduced between the plastic tube ends, and the plastic tube ends being welded after removal of the heating mirror by moving the clamping points toward one another, the plane and/or the heating mirror being capable of being tilted in between the plastic tube ends by means of a controlled movement, at least one sensor for detection or sensing of the plastic tube ends during the controlled movement of tilting in the plane and/or the heating mirror being arranged on the plane and/or on the heating mirror.

It has been found to be advantageous for all the movement stages, and therefore the entire butt welding process, to take place while being controlled, that is to say, besides the process of tilting the plane and the heating mirror in and out, the movement of the clamping points toward one another for the planing, heating and welding take place while being controlled, and manual operation is no longer possible. Preferably, the apparatus stops between the individual steps and requires the operator to check the step, and if necessary to carry out cleaning. In order to continue with the procedure, the operator may confirm the step, and the procedure is continued. By means of the controller of the apparatus, the entire procedure of the butt welding is therefore automated.

The configurations mentioned above may be applied both to the method and to the apparatus.

DRAWINGS

An exemplary embodiment of the invention will be described with the aid of the figure, the invention not being restricted only to the exemplary embodiment.

FIG. 5 shows the heated tube ends butted together.

DETAILED DESCRIPTION OF THE PREFERRED EMBODIMENTS

Figure 1:
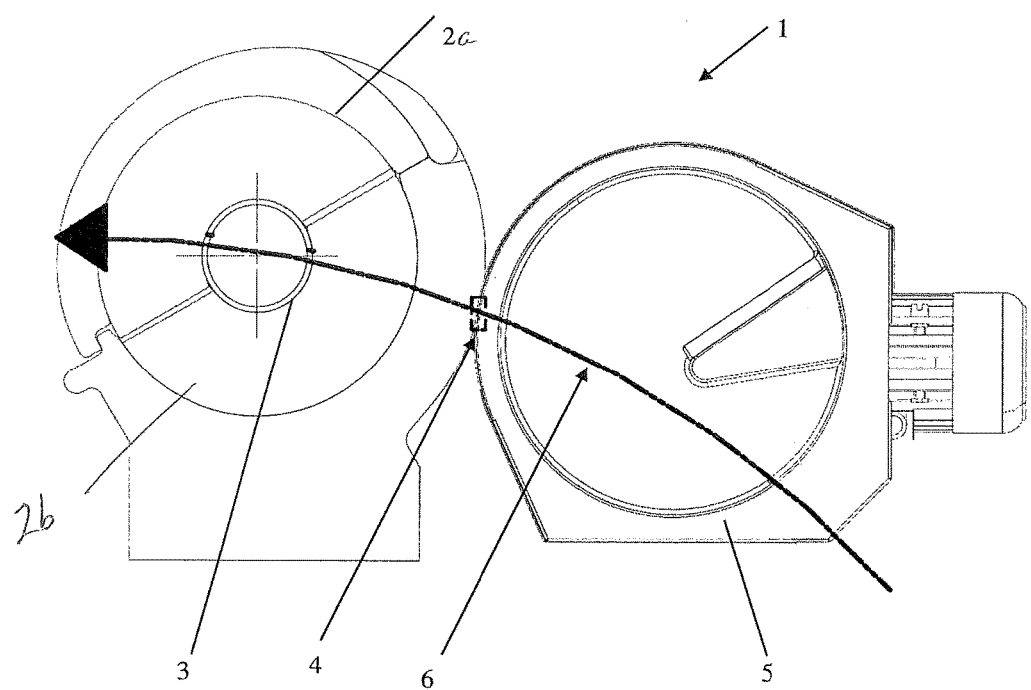
FIG. 1 shows a schematic end view of an apparatus according to the invention for carrying out the method according to the invention.

FIG. 1 shows a schematic representation of the apparatus 1 according to the invention for carrying out the method according to the invention.

In the clamping point 2, one of the tube ends 3 to be welded to one another can be seen, the other clamping point with the clamped tube end lying in front of the view and therefore not being visible.

In the embodiment represented, the sensor 4 is arranged on the plane 5. By the controlled tilting-in of the plane 5, as a result of which that there is a defined tilting movement in relation to distance and speed, the sensor 4 moves constantly along a predetermined curve 6, or a radius.

At the level of the tube end 3, the sensor 4 perceives that there is a tube there and can, by measuring the duration for which the sensor 4 perceives the tube and the speed of the tilting movement and the predetermined distance, therefore determine which tube or tube dimension is clamped. The required welding parameters, which have been stored in relation to dimension and in relation to material in the controller, can therefore be allocated.

As an alternative, the sensor may also be arranged on the heating mirror.

Figure 2:
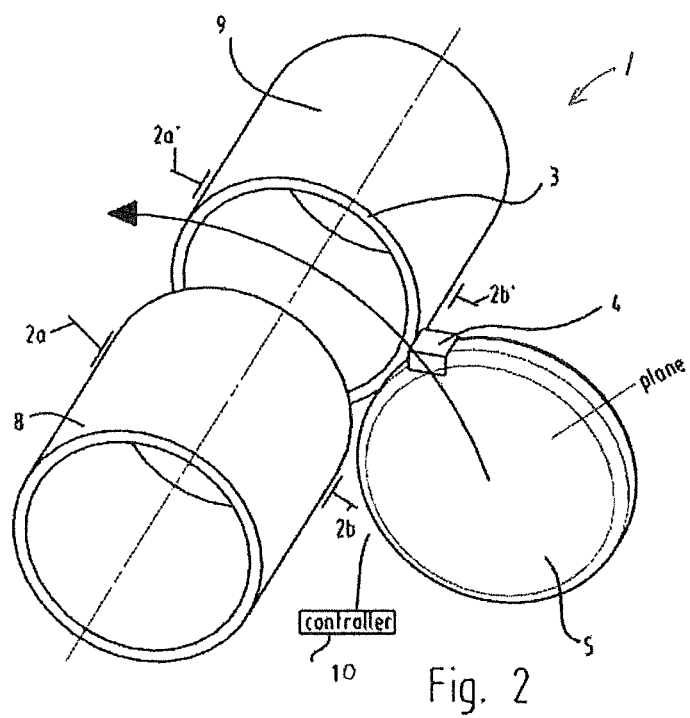
FIG. 2 shows a perspective view of the apparatus shown in FIG. 1 with the plane outside of the tube ends.

FIG. 2 shows the components of the apparatus 1 in perspective view, basically at their beginning position. The tubes 8 and 9 are held in aligned but spaced apart condition by clamps. Here, tube 8 is held by clamps 2a and 2b. Tube 9 is held by clamp 2a' and 2b'. The planing device or simply the plane 5 is shown in position outside of the longitudinal axis of the tubes. The sensor 4 is affixed to part of the plane 5; more particularly, the sensor 4 is affixed to the outer circumstance of plane 5.

Figure 3:
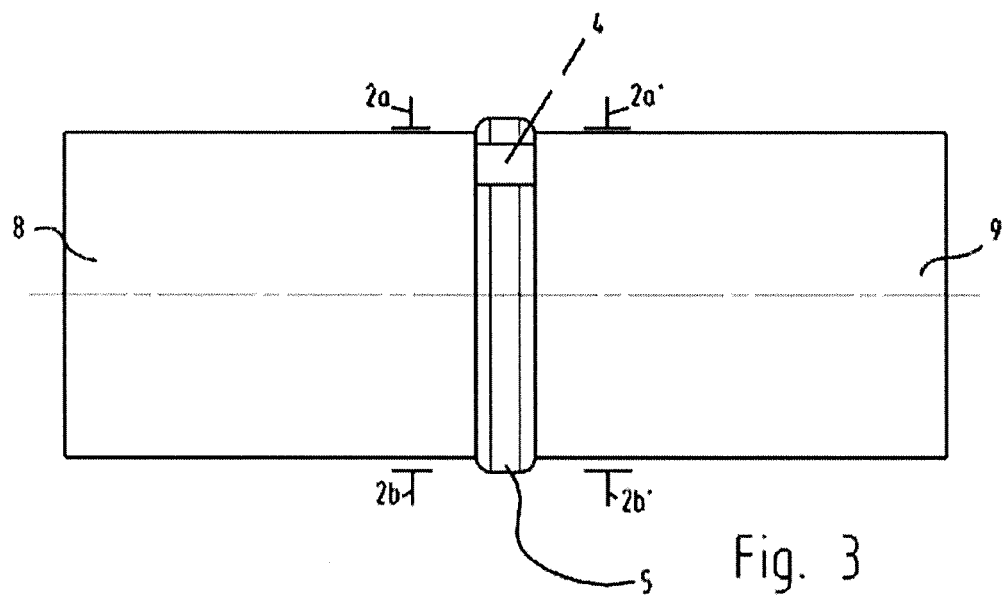
FIG. 3 shows a side view of the apparatus with the plane in contact with the tube ends.

Turning now to FIGS. 1-2, as well as FIG. 3, the plane 5 is tilted or rotated along the arc or curve 6 through the space between the ends of the tubes 8 and 9 as shown in FIG. 3. As the plane 5 is rotated through curve 6, the sensor 4 senses information about the ends of the tubes 8 and 9. As noted above, this information detected by sensor 4 can be a wide variety characteristics of the tubes such as the thickness of the walls of the tube ends, the material in which the tubes are made, the color of the tubes or the hardness of the tubes.

Prior to the beginning of the butt welding process, an operator enters data into controller 10 to control the parameters of the butt welding process. These parameters can vary as known to a person of ordinary skill in the art. Generally, the parameters include time, temperature, pressure and other factors that control the butt welding process. These parameters are stored in controller 10 and compared with the parameters sensed by sensor 4 that are communicated to the controller 10. If the parameters match or are acceptable, the butt welding process can continue. Otherwise, the controller 10 detects an error. Typically, the error is due to incorrect parameters being input to the controller 10 prior to the butt welding process. If an error is detected, suitable warning is given to the operator so that the operator can enter the proper parameters for the particular tubes that are to be butt welded together.

Figure 4:
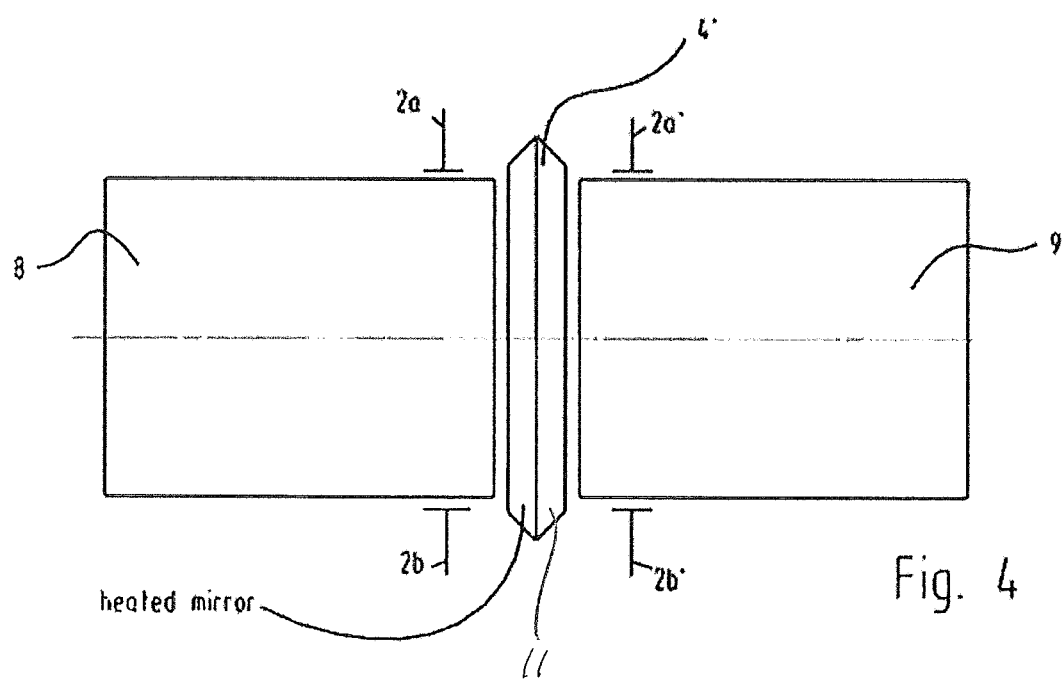
FIG. 4 shows a side view of the apparatus with a heated mirror between the tube ends.

Assuming no error is detected, the butt welding process continues. The plane 5 is circulated to machine the tube ends. Then the plane is moved out and the ends of tubes 8 and 9 are heated by a suitable heating mechanism shown in FIG. 4. Here, the mechanism is a heated mirror 11. The sensor can be placed on the heater mirror instead of the plane 5. This is illustrated by the numeral 4' in FIG. 4. In both cases, the sensor 4 or 4' passes adjacent to the ends of the tubes 8 and 9 during tilting of the plane 5 or heated mirror 11 into the space between the tubes.

Finally, the heated tubes are pressed together under the proper pressure determined by the program parameters in controller 10 as shown in FIG. 5 where the two tube ends are pressed together.

What is claimed is:

1. A method for detecting a characteristic of plastic tube ends of plastic tubes clamped in a butt welding machine, the method comprising:
    clamping plastic tubes in a butt welding machine, the plastic tubes having two opposing respective plastic tube ends which are to be welded together,
    wherein the butt welding machine comprises a plane which can be introduced between the plastic tube ends and a heating mirror which can be introduced between the plastic tube ends, wherein at least one sensor is arranged on the plane and/or on the heating mirror,
    tilting the plane into a position between the plastic tube ends,
    tilting the heating mirror into a position between the plastic tube ends and removing the heating mirror from the position between the plastic heating tube ends,
    wherein the plane and/or the heating mirror is tilted into position between the plastic tube ends by means of a controlled movement,
    detecting a characteristic of the plastic tube ends with the at least one sensor during the controlled movement of the plane and/or the heating mirror by means of the at least one sensor arranged on the plane and/or on the heating mirror.

2. The method according to claim 1, wherein the at least one sensor comprises separate sensors for respectively detecting each of the two opposing plastic tube ends, and the dimensions of the plastic tube ends are respectively detected by means of the separate sensors.

3. The method according to claim 1, wherein the at least one sensor comprises an optical sensor.

4. The method according to claim 1, wherein the at least one sensor comprises a laser.

5. The method according to claim 1, wherein the at least one sensor comprises a capacitive sensor.

6. The method according to claim 1, wherein the detecting step is carried out without any contact between the at least one sensor and either of the plastic tube ends.

7. The method according to claim 1, wherein a dimension of the plastic tube ends is detected by means of the at least one sensor.

8. The method according to claim 1, wherein a material of the plastic tube ends is detected by means of the at least one sensor.

9. A method of welding tube ends together, comprising:
    entering welding parameters into a controller;
    clamping first and second tubes so that respective ends of the tubes are aligned but spaced from each other;
    affixing a sensor to a tool;
    rotating the tool along with the sensor through the space between the tube ends and using the sensor to detect characteristics of the tubes;
    comparing the entered welding parameters in the controller with the characteristics detected by the sensor and, if the comparison is acceptable, butting the ends of the tubes to weld them together.

10. The method of claim 9 wherein the tool is a plane or a heated mirror.

11. An apparatus for butt welding respective ends of first and second plastic tubes, the apparatus comprising:
    first and second clamps for clamping the respective first and second plastic tubes, the first and second clamps arranged such that they are coaxial, the clamps being moveable toward and away from one another,
    a plane, the plane being capable of being introduced between the ends of the clamped plastic tubes in order to plane the plastic tube ends, and
    a heating mirror for heating of the plastic tube ends, the heating mirror being capable of being introduced between the ends of the clamped plastic tubes,
    wherein the apparatus is configured such that the plane and/or the heating mirror is introduced between the plastic tube ends by means of a controlled tilting movement, and
    at least one sensor arranged on the plane and/or on the heating mirror, wherein the at least one sensor is configured to detect a characteristic of the plastic tube ends during the controlled tilting movement of the plane and/or the heating mirror.

12. The apparatus according to claim 11, further comprising a controller configured to control the controlled tilting movement of the plane and/or the heating mirror and movement of the first and second clamps toward and away from one another.

* * * * *